United States Patent
Sirpal et al.

(10) Patent No.: US 9,372,618 B2
(45) Date of Patent: Jun. 21, 2016

(54) GESTURE BASED APPLICATION MANAGEMENT

(75) Inventors: Sanjiv Sirpal, Oakville (CA); Martin Gimpl, Toronto (CA)

(73) Assignee: Z124, George Town (KY)

( * ) Notice: Subject to any disclaimer, the term of this patent is extended or adjusted under 35 U.S.C. 154(b) by 0 days.

(21) Appl. No.: 12/948,684

(22) Filed: Nov. 17, 2010

(65) Prior Publication Data
US 2012/0084690 A1    Apr. 5, 2012

Related U.S. Application Data

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
*G06F 3/00* (2006.01)
*G06F 3/0488* (2013.01)
*G06F 1/16* (2006.01)
(Continued)

(52) U.S. Cl.
CPC .......... *G06F 3/04883* (2013.01); *G06F 1/1616* (2013.01); *G06F 1/1641* (2013.01); *G06F 1/1647* (2013.01); *G06F 3/017* (2013.01); *G06F 3/0412* (2013.01); *G06F 3/0416* (2013.01); *G06F 3/0481* (2013.01); *G06F 3/0483* (2013.01); *G06F 3/0486* (2013.01); *G06F 3/0488* (2013.01); *G06F 3/04842* (2013.01); *G06F 3/04845* (2013.01); *G06F 3/04847* (2013.01); *G06F 3/04886* (2013.01); *G06F 3/1423* (2013.01)

(58) Field of Classification Search
CPC .......................................................... G06F 3/00
USPC .................................. 715/769, 765, 781, 863
See application file for complete search history.

(56) References Cited

U.S. PATENT DOCUMENTS

| | | | |
|---|---|---|---|
| 5,252,951 | A | 10/1993 | Tannenbaum et al. |
| 5,900,848 | A | 5/1999 | Haneda et al. |

(Continued)

FOREIGN PATENT DOCUMENTS

| | | |
|---|---|---|
| CN | 2662553 | 12/2004 |
| CN | 1573648 | 2/2005 |

(Continued)

OTHER PUBLICATIONS

U.S. Appl. No. 13/187,026, filed Jul. 20, 2011, Chen.

(Continued)

*Primary Examiner* — Amy Ng
*Assistant Examiner* — Meseker Takele
(74) *Attorney, Agent, or Firm* — Sheridan Ross P.C.

(57) ABSTRACT

Methods and apparatus for controlling one or more displays using an application manager. The application manager may be displayed in response to a received gesture input. The application manager may provide information regarding applications or screens executing in one or more physical displays on the device. Furthermore, the application manager may be manipulated to change various aspects regarding the applications or screens executing in the one or more displays. This manipulation may include changing the actively displayed screen for a display, movement of screens between displays, or other manipulation of the arrangement or status of the screens.

20 Claims, 14 Drawing Sheets

(51) Int. Cl.
  *G06F 3/0481* (2013.01)
  *G06F 3/0483* (2013.01)
  *G06F 3/0484* (2013.01)
  *G06F 3/0486* (2013.01)
  *G06F 3/01* (2006.01)
  *G06F 3/041* (2006.01)
  *G06F 3/14* (2006.01)

(56) References Cited

U.S. PATENT DOCUMENTS

| | | |
|---|---|---|
| 6,243,645 B1 | 6/2001 | Moteki et al. |
| 6,331,840 B1 | 12/2001 | Nielson |
| 6,385,331 B2 | 5/2002 | Harakawa et al. |
| 6,545,669 B1 | 4/2003 | Kinawi et al. |
| 6,573,883 B1 * | 6/2003 | Bartlett ............... 345/156 |
| 6,788,292 B1 | 9/2004 | Nako et al. |
| 6,861,946 B2 * | 3/2005 | Verplaetse et al. ......... 340/407.2 |
| 6,977,643 B2 | 12/2005 | Wilbrink et al. |
| 7,840,912 B2 | 11/2010 | Elias et al. |
| 7,844,301 B2 | 11/2010 | Lee et al. |
| 7,870,496 B1 | 1/2011 | Sherwani |
| 7,917,584 B2 * | 3/2011 | Arthursson ............... 709/205 |
| 7,936,341 B2 | 5/2011 | Weiss |
| 7,938,721 B2 | 5/2011 | Miyamoto et al. |
| 8,171,427 B2 * | 5/2012 | Chung et al. ................ 715/837 |
| 8,194,043 B2 | 6/2012 | Cheon et al. |
| 8,291,344 B2 * | 10/2012 | Chaudhri ................. 715/838 |
| 8,504,936 B2 | 8/2013 | Gimpl et al. |
| 8,527,892 B2 | 9/2013 | Sirpal et al. |
| 8,599,106 B2 | 12/2013 | Gimpl et al. |
| 8,599,151 B2 | 12/2013 | Narita |
| 8,650,508 B2 | 2/2014 | Lim |
| 8,704,781 B2 | 4/2014 | Kii |
| 8,739,053 B2 | 5/2014 | Chen et al. |
| 8,762,896 B2 | 6/2014 | Lee et al. |
| 8,786,559 B2 | 7/2014 | Hogan |
| 8,793,608 B2 | 7/2014 | Sirpal et al. |
| 8,856,688 B2 | 10/2014 | Tseng |
| 2002/0075289 A1 | 6/2002 | Hatori et al. |
| 2003/0179243 A1 | 9/2003 | Numano |
| 2003/0182597 A1 | 9/2003 | Coha et al. |
| 2003/0189597 A1 * | 10/2003 | Anderson et al. ............. 345/778 |
| 2004/0172279 A1 | 9/2004 | Carolan et al. |
| 2005/0012723 A1 | 1/2005 | Pallakoff |
| 2005/0030255 A1 | 2/2005 | Chiu et al. |
| 2006/0161868 A1 | 7/2006 | Van Dok et al. |
| 2006/0206825 A1 | 9/2006 | Dorn et al. |
| 2006/0227106 A1 * | 10/2006 | Hashimoto et al. ........... 345/157 |
| 2007/0046643 A1 | 3/2007 | Hillis et al. |
| 2007/0064004 A1 | 3/2007 | Bonner et al. |
| 2007/0124503 A1 | 5/2007 | Ramos et al. |
| 2007/0192749 A1 | 8/2007 | Baudisch |
| 2007/0262964 A1 | 11/2007 | Zotov et al. |
| 2008/0062625 A1 | 3/2008 | Batio |
| 2008/0152263 A1 | 6/2008 | Harrison |
| 2008/0168290 A1 | 7/2008 | Jobs et al. |
| 2008/0242359 A1 | 10/2008 | Seol et al. |
| 2008/0307351 A1 | 12/2008 | Louch et al. |
| 2009/0006292 A1 | 1/2009 | Block |
| 2009/0027354 A1 | 1/2009 | Perski et al. |
| 2009/0073194 A1 | 3/2009 | Ording |
| 2009/0102744 A1 | 4/2009 | Ram |
| 2009/0204925 A1 | 8/2009 | Bhat et al. |
| 2009/0209350 A1 | 8/2009 | Kelly et al. |
| 2009/0213081 A1 | 8/2009 | Case, Jr. |
| 2009/0259967 A1 | 10/2009 | Davidson et al. |
| 2009/0278806 A1 | 11/2009 | Duarte et al. |
| 2009/0289874 A1 | 11/2009 | Ha |
| 2009/0298537 A1 | 12/2009 | Choi |
| 2009/0303187 A1 | 12/2009 | Paliakoff |
| 2009/0303231 A1 | 12/2009 | Robinet et al. |
| 2010/0020025 A1 | 1/2010 | Lemort et al. |
| 2010/0031186 A1 | 2/2010 | Tseng et al. |
| 2010/0031202 A1 | 2/2010 | Morris et al. |
| 2010/0064244 A1 | 3/2010 | Kilpatrick, II et al. |
| 2010/0064536 A1 | 3/2010 | Caskey et al. |
| 2010/0081475 A1 | 4/2010 | Chiang et al. |
| 2010/0083154 A1 | 4/2010 | Takeshita |
| 2010/0115473 A1 | 5/2010 | Reeves et al. |
| 2010/0146464 A1 | 6/2010 | Wilson et al. |
| 2010/0156836 A1 | 6/2010 | Katayama |
| 2010/0162128 A1 | 6/2010 | Richardson et al. |
| 2010/0175018 A1 | 7/2010 | Petschnigg et al. |
| 2010/0180297 A1 | 7/2010 | Levine et al. |
| 2010/0182247 A1 | 7/2010 | Petschnigg et al. |
| 2010/0188352 A1 | 7/2010 | Ikeda |
| 2010/0211872 A1 * | 8/2010 | Rolston et al. ............... 715/702 |
| 2010/0211920 A1 | 8/2010 | Westerman et al. |
| 2010/0214237 A1 | 8/2010 | Echeverri et al. |
| 2010/0227650 A1 | 9/2010 | Kim et al. |
| 2010/0231536 A1 | 9/2010 | Chaudhri et al. |
| 2010/0245209 A1 | 9/2010 | Miller et al. |
| 2010/0245256 A1 | 9/2010 | Estrada et al. |
| 2010/0248788 A1 | 9/2010 | Yook et al. |
| 2010/0287513 A1 | 11/2010 | Singh et al. |
| 2010/0295781 A1 | 11/2010 | Alameh et al. |
| 2010/0298032 A1 | 11/2010 | Lee et al. |
| 2010/0321319 A1 | 12/2010 | Hefti |
| 2010/0333011 A1 | 12/2010 | Kornev et al. |
| 2011/0018821 A1 | 1/2011 | Kii |
| 2011/0025601 A1 | 2/2011 | Wilson et al. |
| 2011/0039603 A1 | 2/2011 | Kim et al. |
| 2011/0047459 A1 | 2/2011 | Van Der Westhuizen |
| 2011/0066984 A1 | 3/2011 | Li |
| 2011/0069021 A1 | 3/2011 | Hill |
| 2011/0074696 A1 | 3/2011 | Rapp et al. |
| 2011/0078624 A1 * | 3/2011 | Missig et al. ................. 715/802 |
| 2011/0081889 A1 | 4/2011 | Gao et al. |
| 2011/0090255 A1 | 4/2011 | Wilson et al. |
| 2011/0107272 A1 | 5/2011 | Aguilar et al. |
| 2011/0125398 A1 | 5/2011 | Bos |
| 2011/0145768 A1 | 6/2011 | Leffert et al. |
| 2011/0209058 A1 | 8/2011 | Hinckley et al. |
| 2011/0209099 A1 * | 8/2011 | Hinckley et al. ............... 715/863 |
| 2011/0209100 A1 | 8/2011 | Hinckley et al. |
| 2011/0209102 A1 | 8/2011 | Hinckley et al. |
| 2011/0209104 A1 | 8/2011 | Hinckley et al. |
| 2011/0221678 A1 | 9/2011 | Davydov |
| 2011/0228463 A1 | 9/2011 | Matagne |
| 2011/0242138 A1 | 10/2011 | Tribble |
| 2011/0260997 A1 | 10/2011 | Ozaki |
| 2011/0265021 A1 | 10/2011 | Chien et al. |
| 2011/0285631 A1 | 11/2011 | Imamura et al. |
| 2011/0291964 A1 | 12/2011 | Chambers et al. |
| 2012/0050779 A1 | 3/2012 | Tani et al. |
| 2012/0056817 A1 | 3/2012 | Griffin et al. |
| 2012/0081293 A1 | 4/2012 | Sirpal et al. |
| 2012/0081306 A1 | 4/2012 | Sirpal et al. |
| 2012/0081307 A1 | 4/2012 | Sirpal et al. |
| 2012/0081308 A1 | 4/2012 | Sirpal |
| 2012/0081310 A1 | 4/2012 | Schrock |
| 2012/0081316 A1 | 4/2012 | Sirpal et al. |
| 2012/0084673 A1 | 4/2012 | Sirpal et al. |
| 2012/0084678 A1 | 4/2012 | Sirpal et al. |
| 2012/0084679 A1 | 4/2012 | Sirpal et al. |
| 2012/0084680 A1 | 4/2012 | Gimpl et al. |
| 2012/0084700 A1 | 4/2012 | Sirpal et al. |
| 2012/0084725 A1 | 4/2012 | Sirpal et al. |
| 2012/0084735 A1 | 4/2012 | Sirpal |
| 2012/0084736 A1 | 4/2012 | Sirpal |
| 2012/0084737 A1 | 4/2012 | Gimpl et al. |
| 2012/0242599 A1 | 9/2012 | Seo et al. |
| 2015/0020021 A1 | 1/2015 | Marr et al. |
| 2016/0034176 A1 | 2/2016 | Sirpal |
| 2016/0062554 A1 | 3/2016 | Sirpal et al. |
| 2016/0062593 A1 | 3/2016 | Schrock |

FOREIGN PATENT DOCUMENTS

| | | |
|---|---|---|
| CN | 1933883 | 3/2007 |
| CN | 1941974 | 4/2007 |
| CN | 1949905 | 4/2007 |
| CN | 101038737 | 9/2007 |

(56) References Cited

FOREIGN PATENT DOCUMENTS

| | | |
|---|---|---|
| CN | 101655753 | 2/2010 |
| CN | 101661383 | 3/2010 |
| CN | 101727268 | 6/2010 |
| CN | 102084325 | 6/2011 |
| CN | 102150096 | 8/2011 |
| DE | 19739284 | 3/1999 |
| EP | 2166437 | 3/2010 |
| EP | 2169949 | 3/2010 |
| EP | 2214088 | 8/2010 |
| EP | 2226713 | 9/2010 |
| EP | 2309368 | 4/2011 |
| EP | 2309369 | 4/2011 |
| JP | H09-305262 | 11/1997 |
| JP | H11-242539 | 9/1999 |
| JP | 2002-259001 | 9/2002 |
| JP | 2003-280622 | 10/2003 |
| JP | 2005-284886 | 10/2005 |
| JP | 2007-109240 | 4/2007 |
| JP | 2009-211547 | 9/2009 |
| JP | 2010-015239 | 1/2010 |
| JP | 2010-039636 | 2/2010 |
| JP | 2010-92340 | 4/2010 |
| JP | 2010-160581 | 7/2010 |
| JP | 2010-211400 | 9/2010 |
| WO | WO 2005/119404 | 12/2005 |
| WO | WO 2009/067224 | 5/2009 |
| WO | WO 2010/001699 | 1/2010 |
| WO | WO 2010/010835 | 1/2010 |
| WO | WO 2010/028405 | 3/2010 |
| WO | WO 2010/028406 | 3/2010 |
| WO | WO 2010/111391 | 9/2010 |

OTHER PUBLICATIONS

U.S. Appl. No. 13/629,085, filed Sep. 27, 2012, Reeves et al.
U.S. Appl. No. 13/629,173, filed Sep. 27, 2012, Reeves et al.
"Lapdock™ for Motorola ATRIX," at http://www.motorola.com/Consumers/US-EN/Consumer-Product-and-Services/Mobile . . . , accessed Apr. 18, 2011, 1 page.
"Motorola ATRIX 4G Laptop Dock Review," at http://www.phonearena.com/reviews/Motorola-ATRIX-4G-Laptop-Dock-Review_id2667, Mar. 2, 2011, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Google images, accessed Apr. 18, 2011, 6 pages.
Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Website entitled, "Sony Tablet," at store.sony.com/webapp/wcs/stores/servlet/CategoryDisplay?catalog Id=10551&storeId=10151&langId=-1&categoryId=8198552921644795521, 2011, 3 pages.
Website entitled, "Kyocera Echo," at www.echobykyocera.com/, 2011, 6 pages.
International Search Report and Written Opinion for International (PCT) Patent Application No. PCT/US11/53937, mailed Feb. 27, 2012 11 pages.
International Search Report and Written Opinion for International (PCT) Patent Application No. PCT/US2011/053771, mailed Feb. 24, 2012 9 pages.
International Search Report and Written Opinion for International (PCT) Patent Application No. PCT/US2011/053773, mailed Feb. 14, 2012 11 pages.
International Search Report and Written Opinion for International (PCT) Patent Application No. PCT/US11/53776, mailed Feb. 13, 2012 8 pages.
International Search Report and Written Opinion for International (PCT) Patent Application No. PCT/US11/53779, mailed Feb. 13, 2012 7 pages.
International Search Report for International (PCT) Patent Application No. PCT/US11/53781, mailed Feb. 13, 2012 8 pages.
International Search Report for International (PCT) Patent Application No. PCT/US2011/052932, mailed Apr. 27, 2012 3 pages.
International Search Report for International (PCT) Patent Application No. PCT/US2011/053032, mailed Apr. 27, 2012 3 pages.
International Search Report for International (PCT) Patent Application No. PCT/US2011/052815, mailed Apr. 27, 2012 3 pages.
International Search Report for International (PCT) Patent Application No. PCT/US2011/052802, mailed Apr. 27, 2012 4 pages.
International Preliminary Report on Patentability for International (PCT) Patent Application No. PCT/US11/53937, mailed Apr. 11, 2013 10 pages.
International Preliminary Report on Patentability and Written Opinion for International (PCT) Patent Application No. PCT/US2011/053771, mailed Apr. 11, 2013 8 pages.
International Preliminary Report on Patentability for International (PCT) Patent Application No. PCT/US2011/053773, mailed Apr. 11, 2013 12 pages.
International Preliminary Report on Patentability for International (PCT) Patent Application No. PCT/US11/53776, mailed Apr. 11, 2013 7 pages.
International Preliminary Report on Patentability for International (PCT) Patent Application No. PCT/US11/53779, mailed Apr. 11, 2013 6 pages.
International Preliminary Report on Patentability for International (PCT) Patent Application No. PCT/US11/53781, mailed Apr. 11, 2013 7 pages.
International Preliminary Report on Patentability and Written Opinion for International (PCT) Patent Application No. PCT/US2011/052932, mailed Apr. 11, 2013 7 pages.
International Preliminary Report on Patentability and Written Opinion for International (PCT) Patent Application No. PCT/US2011/053032, mailed Apr. 11, 2013 5 pages.
International Preliminary Report on Patentability and Written Opinion for International (PCT) Patent Application No. PCT/US2011/052815, mailed Apr. 11, 2013 6 pages.
International Preliminary Report on Patentability and Written Opinion for International (PCT) Patent Application No. PCT/US2011/052802, mailed Apr. 11, 2013 7 pages.
Official Action for U.S. Appl. No. 13/247,977, mailed Apr. 2, 2013 17 pages.
Official Action for U.S. Appl. No. 13/223,747, mailed May 31, 2013 22 pages.
Official Action for U.S. Appl. No. 13/223,674, mailed Nov. 20, 2012 19 pages.
Final Action for U.S. Appl. No. 13/223,674, mailed Jun. 7, 2013 21 pages.
Official Action for U.S. Appl. No. 13/223,809, mailed May 1, 2013, 17 pages.
Official Action for U.S. Appl. No. 13/223,727, mailed May 14, 2013, 11 pages.
Official Action for U.S. Appl. No. 13/223,697, mailed May 21, 2013, 23 pages.
Official Action for U.S. Appl. No. 12/948,667, mailed Sep. 26, 2012 15 pages.
Final Action for U.S. Appl. No. 12/948,667, mailed May 24, 2013 17 pages.
Official Action for U.S. Appl. No. 12/948,676, mailed Oct. 11, 2012 8 pages.
Final Action for U.S. Appl. No. 12/948,676, mailed May 9, 2013 12 pages.
Official Action for U.S. Appl. No. 13/187,026, mailed Jun. 18, 2013 5 pages.
Bretzner et al., "Hand Gesture Recognition using Multi-Scale Colour Features, Hierarchical Models and Particle Filtering," Proceedings Fifth IEEE Conference on Automatic Face and Gesture Recognition, 2002, pp. 1-6.
European Search Report for European Patent Application No. 11829844.7, mailed Jul. 16, 2014, 9 pages.

(56) References Cited

OTHER PUBLICATIONS

Extended European Search Report and Search Opinion for European Patent Application No. 11829763.9, mailed Jun. 26, 2014 7 pages.
Final Action for U.S. Appl. No. 13/247,977, mailed Aug. 1, 2013 22 pages.
Official Action for U.S. Appl. No. 13/247,977, mailed Mar. 26, 2014 17 pages.
Final Action for U.S. Appl. No. 13/223,747, mailed Dec. 18, 2013 22 pages.
Official Action for U.S. Appl. No. 13/223,747, mailed Jun. 10, 2014 25 pages.
Official Action for U.S. Appl. No. 13/223,674, mailed Aug. 1, 2014 24 pages.
Notice of Allowance for U.S. Appl. No. 13/247,822, mailed Oct. 2, 2013, 15 pages.
Final Action for U.S. Appl. No. 13/223,809, mailed Nov. 20, 2013, 20 pages.
Official Action for U.S. Appl. No. 13/223,809, mailed Jun. 16, 2014, 18 pages.
Final Action for U.S. Appl. No. 13/223,727, mailed Nov. 20, 2013, 13 pages.
Official Action for U.S. Appl. No. 13/223,727, mailed Jun. 16, 2014, 13 pages.
Final Action for U.S. Appl. No. 13/223,697, mailed Dec. 2, 2013, 23 pages.
Official Action for U.S. Appl. No. 13/223,697, mailed Apr. 1, 2014, 23 pages.
Official Action for U.S. Appl. No. 13/629,173, mailed May 22, 2014, 14 pages.
Official Action for U.S. Appl. No. 12/948,667, mailed Jul. 24, 2014 17 pages.
Official Action for U.S. Appl. No. 12/948,676, mailed Sep. 26, 2013 11 pages.
Final Action for U.S. Appl. No. 12/948,676, mailed Apr. 24, 2014 15 pages.
Official Action for U.S. Appl. No. 13/187,026, mailed Nov. 20, 2013 10 pages.
Notice of Allowance for U.S. Appl. No. 13/187,026, mailed Mar. 10, 2014 8 pages.
Final Action for U.S. Appl. No. 13/247,977, mailed Oct. 23, 2014 20 pages.
Notice of Allowance for U.S. Appl. No. 13/223,747, mailed Dec. 3, 2014 8 pages.
Notice of Allowance for U.S. Appl. No. 13/223,674, mailed Nov. 26, 2014 13 pages.
Notice of Allowance for U.S. Appl. No. 13/223,727, mailed Nov. 20, 2014 8 pages.
Final Action for U.S. Appl. No. 13/223,697, mailed Oct. 14, 2014 16 pages.
Official Action for U.S. Appl. No. 13/629,085, mailed Sep. 12, 2014 10 pages.
Final Action for U.S. Appl. No. 13/629,173, mailed Sep. 12, 2014 17 pages.
Official Action for U.S. Appl. No. 12/948,675, mailed Oct. 31, 2014 15 pages.
"Connect the Brix Phones together for a Larger Media Screen," 2014, retrieved Jul. 13, 2014 from http://walyou.com/connect-the-brix-phones-together-for-a-larger-media-screen/, 5 pages.
"Microsoft Patents Dual-Screen Phone From the Future (Video & Pics)," retrieved Jul. 13, 2014 from www.wp7connect.com/2011/07/09/microsoft-patents-dual-screen-phone-from-the-future-video-pics/, 2 pages.
Webb, "Samsung files patent for a phone with Two Screens to make reading, gaming and conference calls easier," MAILOnline, Dec. 18, 2013, retrieved Jul. 13, 2014 from http://www.dailymail.co.uk/sciencetech/article-2525812/Double-vision-Samsung-unveils-phone-two-screens-easier-reading-gaming-video-conferencing.html, 19 pages.
Final Action for U.S. Appl. No. 13/223,809, mailed Dec. 3, 2014, 20 pages.
Notice of Allowance for U.S. Appl. No. 13/629,085, mailed Feb. 6, 2015 24 pages.
Official Action for U.S. Appl. No. 13/629,173, mailed Jan. 30, 2015 20 pages.
Notice of Allowance for U.S. Appl. No. 12/948,667, mailed Jan. 7, 2015 10 pages.
Final Action for U.S. Appl. No. 12/948,675, mailed May 6, 2015 18 pages.
Official Action for U.S. Appl. No. 12/948,676, mailed Jan. 6, 2015 16 pages.
U.S. Appl. No. 14/945,844, filed Nov. 19, 2015, Gimpl et al.
"Palm Pre employing HTML5 equips multi-task operation," (English translated title) Nikkei Business Publications, Inc., Aug. 10, 2009, vol. 1010, pp. 38-43.
Hinckley et al., "Stitching: Pen Gestures that Span Multiple Displays," Proc. Of the Working Conference on Advanced Visual Interfaces, Jan. 1, 2004, pp. 23-31.
Official Action (with English translation) for Chinese Patent Application No. 2011800515271, dated Dec. 31, 2015, 22 pages.
Extended European Search Report for European Patent Application No. 11829890, date Jun. 8, 2015, 8 pages.
Official Action (with English translation) for Japanese Patent Application No. 2013-531849, dated Oct. 27, 2015, 8 pages.
Official Action for Mexican Patent Application No. MX/a/2013/003249, dated Jan. 14, 2016, 3 pages.
Official Action (with English translation) for Chinese Patent Application No. 201180058029, dated Sep. 6, 2015, 15 pages.
Extended European Search Report for European Patent Application No. 11829839.7, dated May 11, 2015, 6 pages.
Official Action (with English translation) for Japanese Patent Application No. 2013-531785, issued Dec. 1, 2015, 3 pages.
Official Action (with English translation) for Chinese Patent Application No. 201180056896, dated Jul. 21, 2015, 26 pages.
Official Action (with English translation) for Chinese Patent Application No. 201180056896, dated Mar. 18, 2016, 24 pages.
Official Action (with English translation) for Japanese Patent Application No. 2013-531788, dated Nov. 4, 2015, 10 pages.
Official Action (with English translation) for Chinese Patent Application No. 201180057652.3, dated Nov. 20, 2015, 24 pages.
Official Action (with English translation) for Japanese Patent Application No. 2013-531674, mailed Nov. 10, 2015, 7 pages.
Official Action (with English translation) for Chinese Patent Application No. 201180057378, dated Oct. 27, 2015, 16 pages.
Extended European Search Report and Search Opinion for European Patent Application No. 11829757.1, mailed May 7, 2015 8 pages.
Notice of Allowance (with English translation) for Japanese Patent Application No. 2013-531667, dated Nov. 10, 2015, 2 pages.
Official Action (with English summary) for Mexican Patent Application No. MX/a/2013/003424, dated Jan. 13, 2016, 5 pages.
Official Action for U.S. Appl. No. 13/247,977, mailed Jul. 13, 2015 21 pages.
Final Action for U.S. Appl. No. 13/247,977, mailed Dec. 10, 2015 20 pages.
Official Action for U.S. Appl. No. 13/223,809, mailed Jun. 4, 2015, 22 pages.
Final Action for U.S. Appl. No. 13/629,173, mailed Jun. 5, 2015 18 pages.
Final Action for U.S. Appl. No. 12/948,676 mailed Aug. 20, 2015 29 pages.

\* cited by examiner

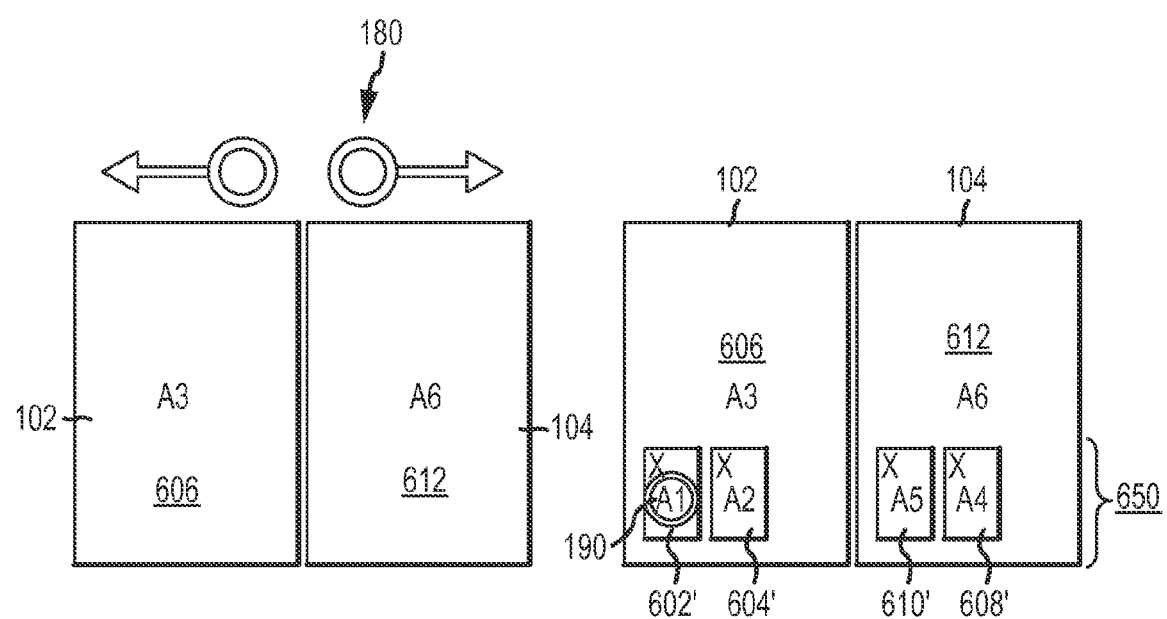

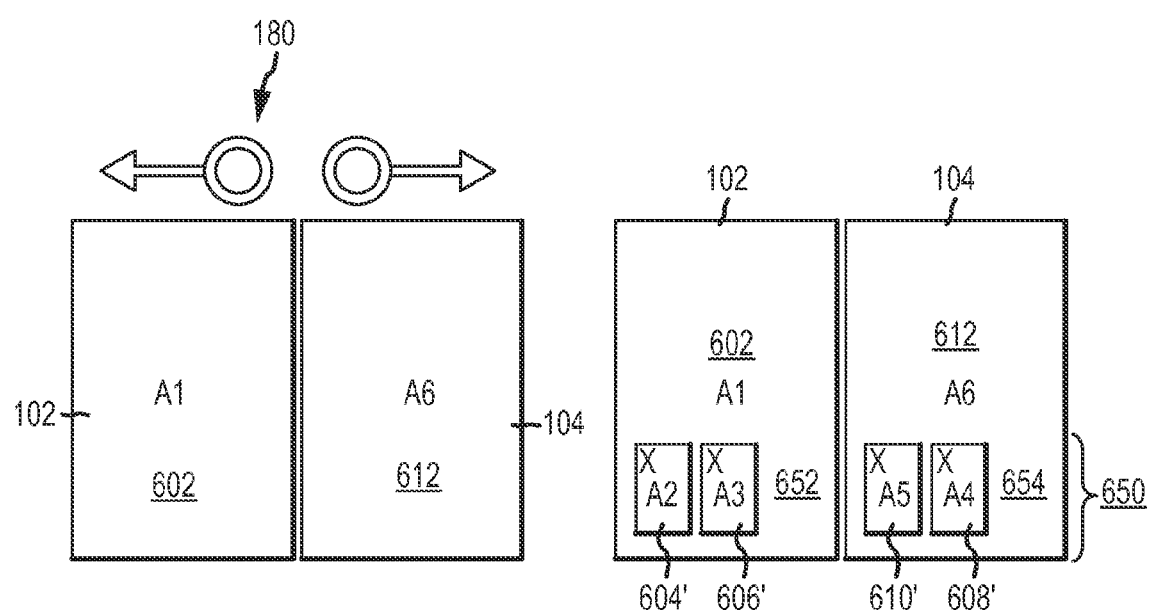

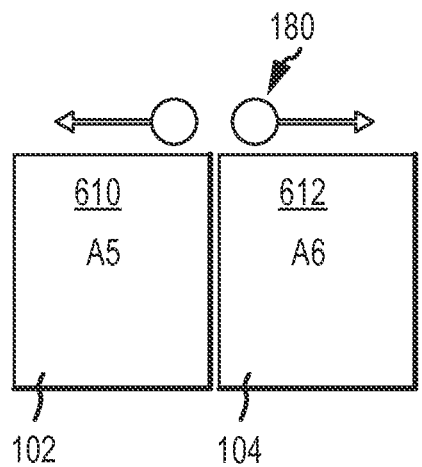
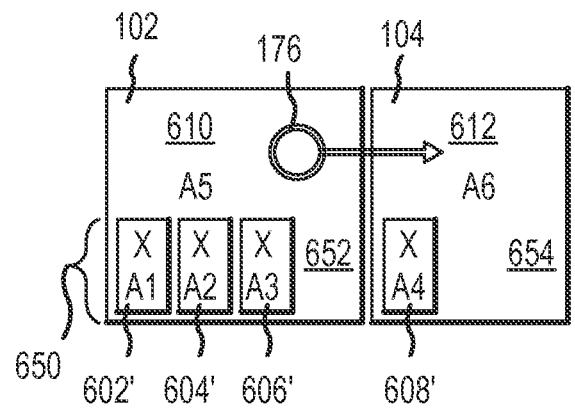
FIG.10A   FIG.10B
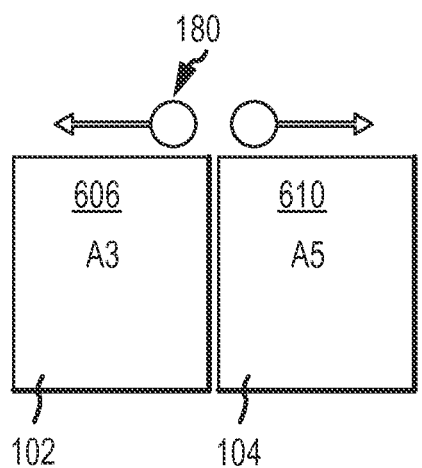
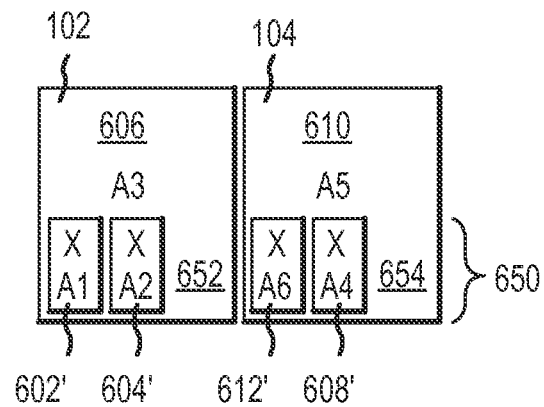
FIG.10C   FIG.10D

GESTURE BASED APPLICATION MANAGEMENT

RELATED APPLICATIONS

This application claims priority to U.S. Provisional Application Ser. No. 61/389,000, filed Oct. 1, 2010, entitled "DUAL DISPLAY WINDOWING SYSTEM"; Provisional Application Ser. No. 61/389,117, filed Oct. 1, 2010, entitled "MULTI-OPERATING SYSTEM PORTABLE DOCKING DEVICE"; and Provisional Application Ser. No. 61/389,087, filed Oct. 1, 2010, entitled "TABLET COMPUTING USER INTERFACE". Each and every part of the foregoing provisional applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect of the present invention includes a method for controlling a handheld computing device. The method includes logically associating one or more applications with a first display. The method also includes providing a second display with which the one or more applications may be logically associated. As such, the second display is capable of being logically associated with applications, yet in some embodiments may not actually have any applications associated with it. The method also includes establishing a first application stack corresponding to the one or more applications logically associated with the first display. Additionally, a second application stack is established corresponding to any applications that may be logically associated with the second display, if any. The method also includes receiving a gesture input at a gesture sensor of the handheld computing device and displaying an application manager in response to the receiving step. The application manager provides a graphical representation of the first application stack and the second application stack.

A second aspect of the present invention includes a handheld computing device. The device includes a processor and a first display operable to display a first screen. The first display is in operative communication with the processor. Also, a second display is operable to display a second screen. The second display is also in operative communication with the processor. At least one gesture sensor operable to receive a gesture input is provided with the device. The processor is operative to control at least one of the first display and the second display such that an application manager is displayed on at least one of the first display and the second display in response to receipt of the gesture input.

A number of feature refinements and additional features are applicable to the first and second aspects. These feature refinements and additional features may be used individually or in any combination. As such, each of the following features that will be discussed may be, but are not required to be, used with any other feature or combination of features of any of the aspects presented herein.

In one embodiment, the first display and the second display may each be operable to display only one application at a time. The application manager may include icons representing the one or more applications associated with the first display in a first portion of the application manager and icons representing applications associated with the second display, if any, in a second portion of the application manager. It may be that only the applications that are not actively displayed in one of the first display and second display are represented by the icons in the application manager. The first portion of the application manager may be displayed in the first display, and the second portion of the application manager may be displayed in said second display. The icons may be arranged in a respective portion of the application manager according to the relative position of the one or more applications in the first application stack and the relative position of applications in the second application stack. As such, the position of the icon in the display may depend on the associated application's position in one of the stacks. In one embodiment, the icons may be screen shot representations of a corresponding application.

In another embodiment, the method may also include selecting an application from one of the first application stack and the second application stack in the application manager and modifying a corresponding one of the first display and the second display to render the selected application on the corresponding one of the first and the second display. In this regard, the logical association of said one or more applications may be controllable by user interaction with the application manager. The method may also include selecting an application comprising an actively displayed application of one of the first and second display, dragging the application to the other of the first and second display, and changing the other of the first and second display such that the application is the actively displayed application on the other of the first and second display. The interaction with the application manager may include manipulation of the icons representing the one or more applications.

In yet another embodiment, the method may include moving an application from one of the first and second application stacks to another of the first and second application stacks by dragging an icon representative of the application from the first portion of the application manager displayed on the first display to the second portion of the application manager displayed on the second display. Additionally, the method may involve dragging an application from the first portion of the application manager to the second display and modifying the second display to render the application. Further still, the method may include closing any one of the one or more applications by selecting a corresponding close icon from the application manager.

In still other embodiments, the gesture input may be a spread gesture. Additionally, the first display may be a first portion of a unitary display and the second display may be a second portion of a unitary display. In other embodiments, the handheld computing device may be a smart phone. The first display and second display may positionable with respect to each other between an open and closed position. In this regard, when in the open position, the first display and the second display are visible from the vantage point of a user. Alternatively, when in the closed position, only one of the first display and the second display are visible from the vantage point of a user.

BRIEF DESCRIPTION OF THE DRAWINGS

FIGS. 7A-7D are graphical representations of an embodiment of a handheld computing device displaying an application manager in response to a gesture and reacting in response to commands received via the application manager.

FIGS. 10A-10D are graphical representations of an embodiment of a handheld computing device displaying an application manager in response to a gesture and reacting in response to commands received when the application manager is displayed

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
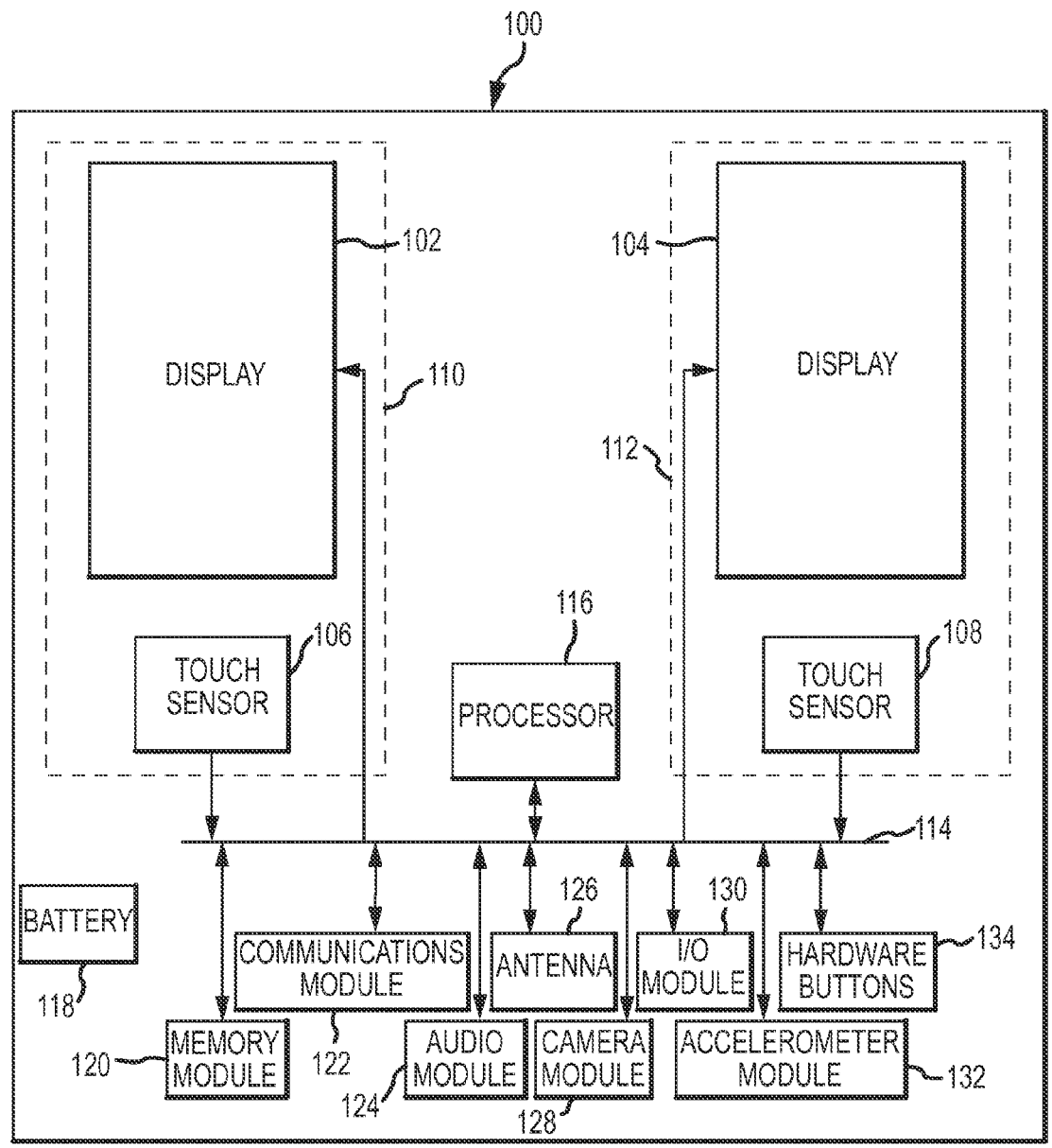
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes more than two displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single touch sensor may be provided that allows for inputs to control both the first display 102 and the second display 104. The single touch sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 11A:
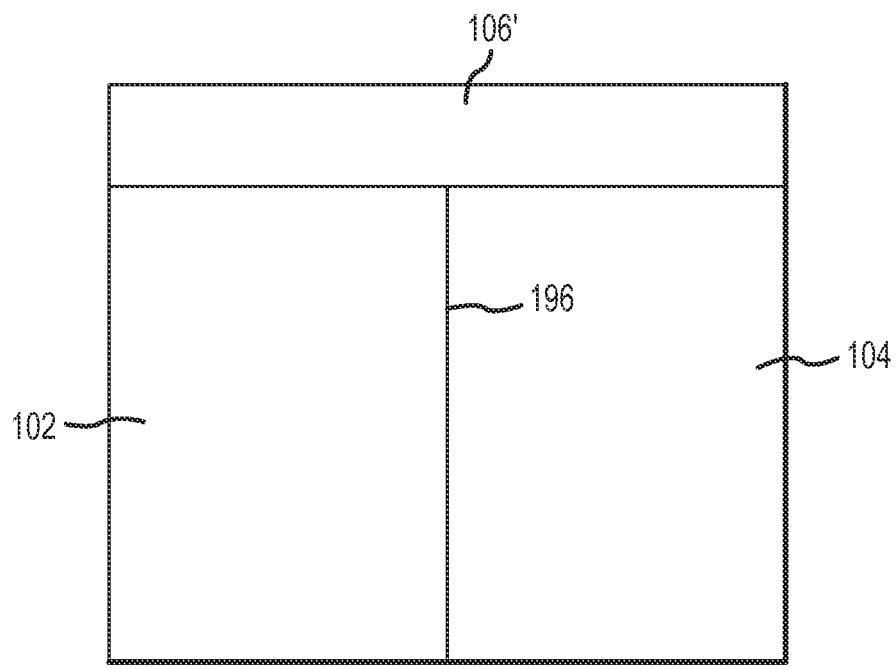
FIGS. 11A and 11B are schematic views of embodiments of a handheld computing device provided with touch sensitive devices.
Figure 11B:
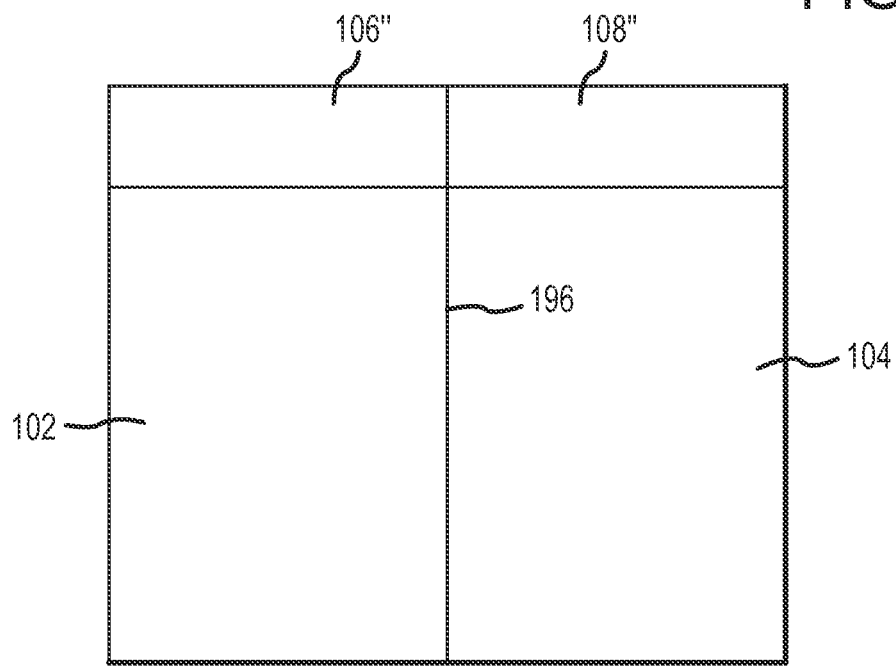

With reference to FIGS. 11A and 11B, various potential arrangements are depicted for the first display 102, the second display 104, and touch sensors 106', 106", and 108". In FIG. 11A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 11B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 11A and 11B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

With further reference to FIGS. 2A-D, various screens of an embodiment of a device are shown. multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
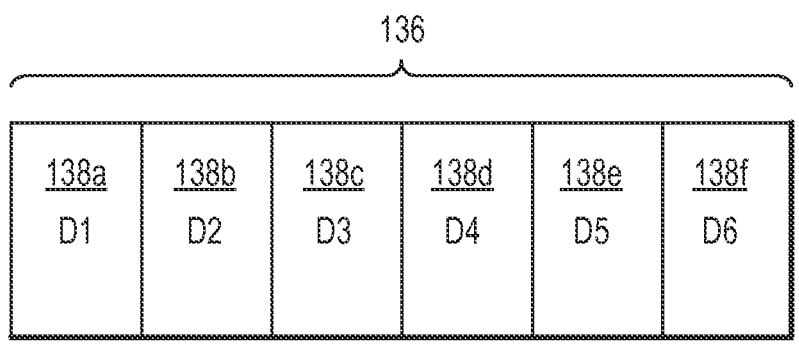
FIGS. 2A-D are graphical representations of an embodiment of a handheld computing device in various instances of operation.

A desktop sequence 136 is displayed in FIG. 2A. The desktop sequence 136 may include a number of individual desktop screens 138*a*-138*f*. Thus, each desktop screen 138 may occupy substantially the entirety of a single display (e.g., the first display 102 or second display 104 of FIG. 1). The desktop screens 138*a*-138*f* may be in a predetermined order such that the desktop screens 138*a*-138*f* appear consecutively and the order in which the desktop screens appear may not be reordered. However, the desktop screens 138*a*-138*f* may be sequentially navigated (e.g., in response to a user input). That is, one or more of the desktop screens 138*a*-138*f* may be sequentially displayed on a handheld device as controlled by a user input.

Figure 2B:
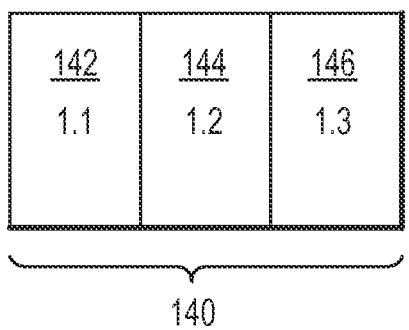
Figure 2C:
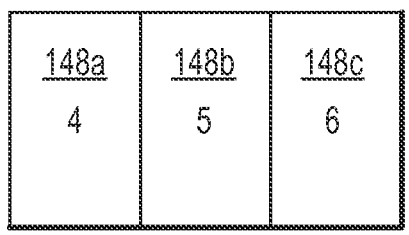

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen for which the leaf screen 146 is a parent. As such, the leaf screen does not have any children node screens 144. FIG. 2C depicts various single screen applications 148*a*, 148*b*, and 148*c* arranged sequentially. Each of these single screen applications may correspond to a different executing application. For instance, in FIG. 2C Application 4, Application 5, and Application 6 may be executing on the device and correspond to each single screen 148*a*, 148*b*, and 148*c*, respectively.

Figure 2D:
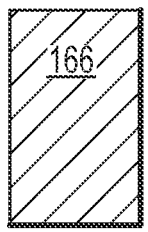

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). While shown in FIG. 2D as a grayed screen, an empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3A:
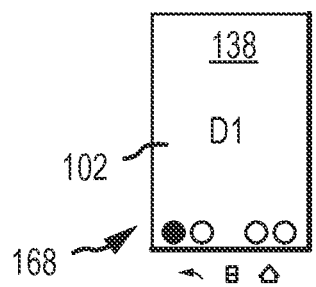
FIGS. 3A-K are graphical representations of an embodiment of a handheld computing device provided in different positions, orientations, and instances of operation.
Figure 3B:
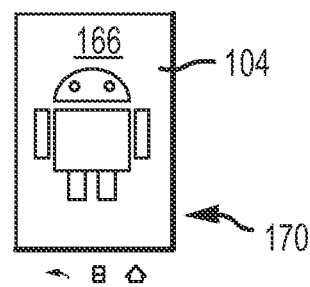

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 or may simply display an empty view 166 (e.g., displaying an icon or other graphic) and lack functionality as an interface.

Figure 3C:
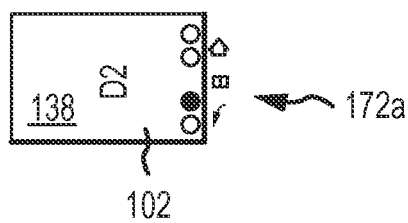
Figure 3D:
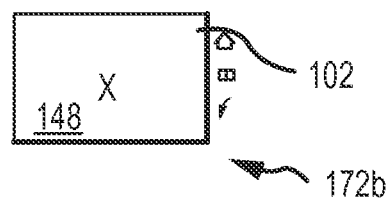

FIG. 3C depicts a closed device in a landscape orientation 172$a$. In one embodiment, a landscape mode (i.e., wherein the display is adjusted to display a screen 148 in a landscape orientation) may not be enabled as shown in FIG. 3C. Alternatively, the landscape mode may be enabled such that the screen 148 is modified when the device is sensed in a landscape orientation 172$b$, such that the screen 148 is rendered in a landscape orientation as shown at FIG. 3D.

Figure 3E:
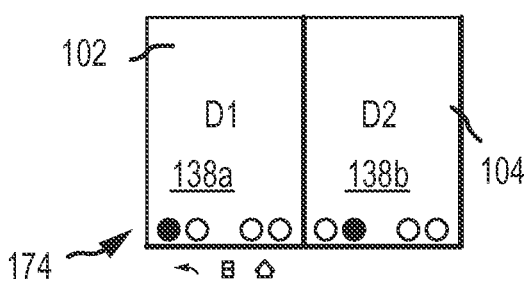

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138$a$, 138$b$, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Figure 3F:
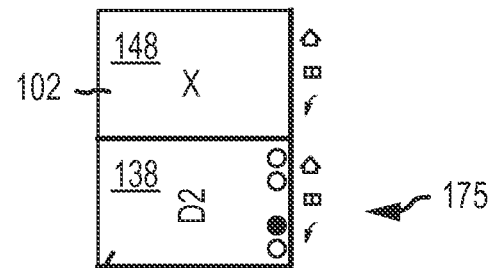
Figure 3G:
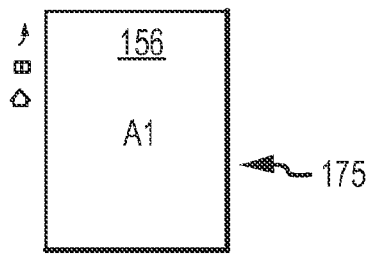
Figure 3H:
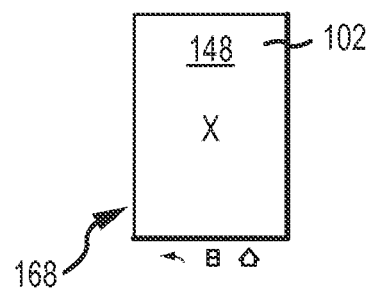

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation 172 may display a multi screen GUI 156 that may occupy both displays 102, 104 in a portrait orientation as shown in FIG. 3G such that the individual displays are in a landscape orientation.

Figure 3I:
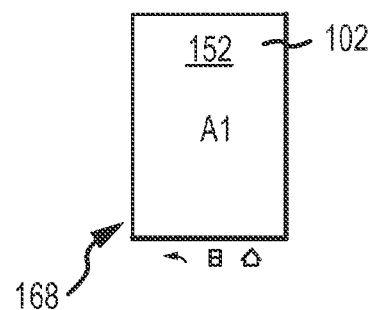
Figure 3J:
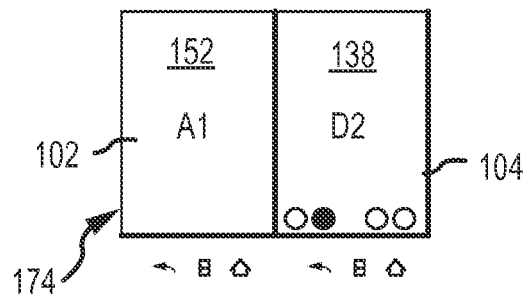
Figure 3K:
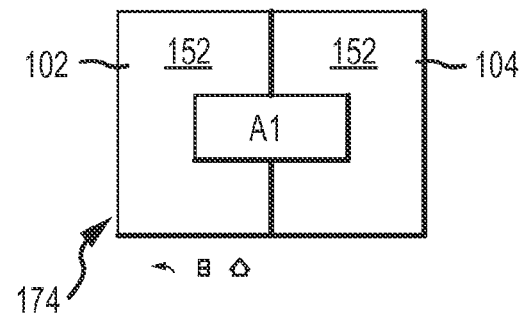

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
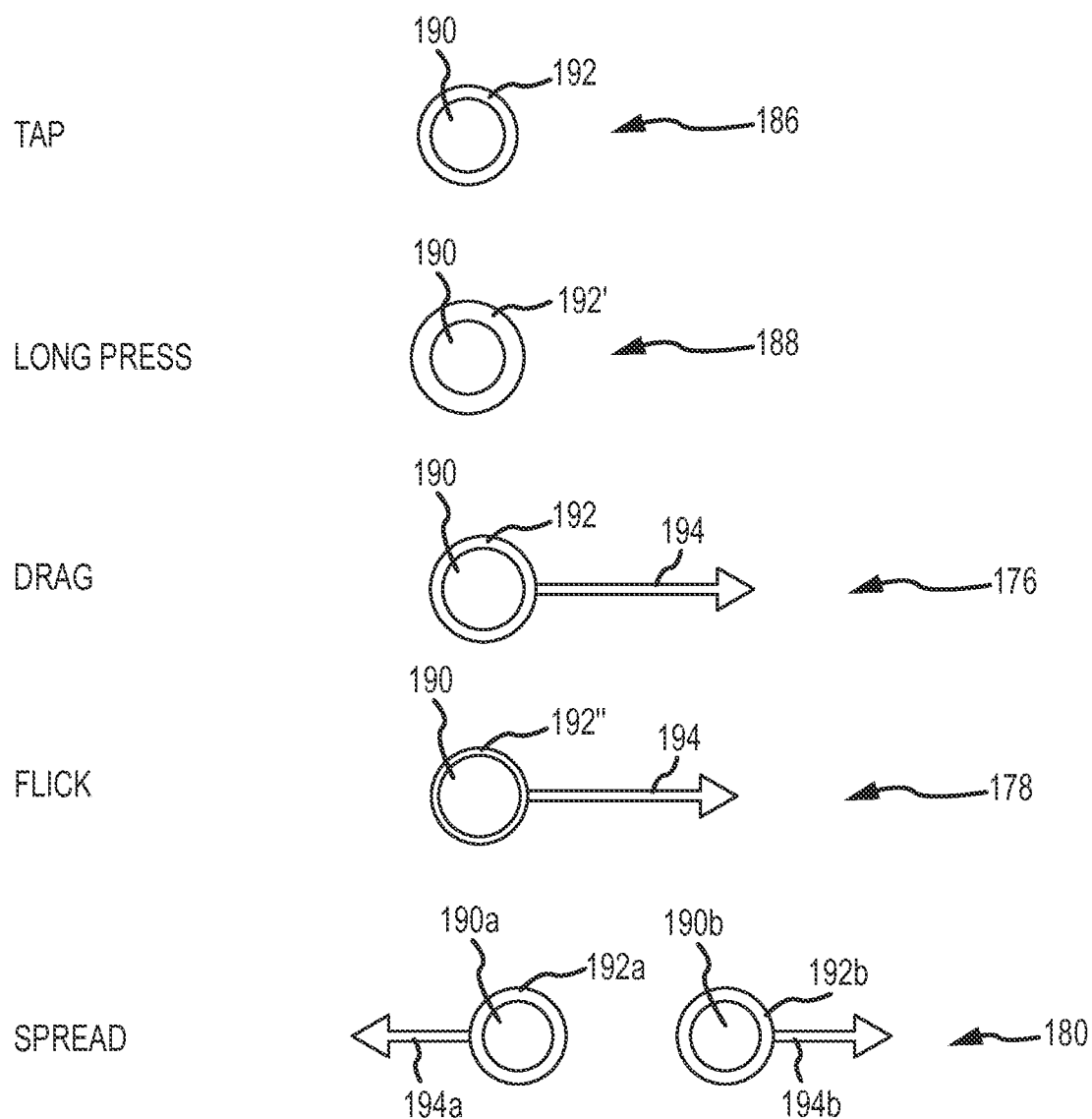
FIG. 4 includes graphical representations of various gesture inputs for controlling a handheld computing device.

FIG. 4 depicts various graphical representations of gesture inputs that may be recognized by a handheld computing device. Such gestures may be received at one or more touch sensitive portions of the device. In this regard, various input mechanisms may be used in order to generate the gestures shown in FIG. 4. For example a stylus, a user's finger(s), or other devices may be used to activate the touch sensitive device in order to receive the gestures. The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

Figure 12:
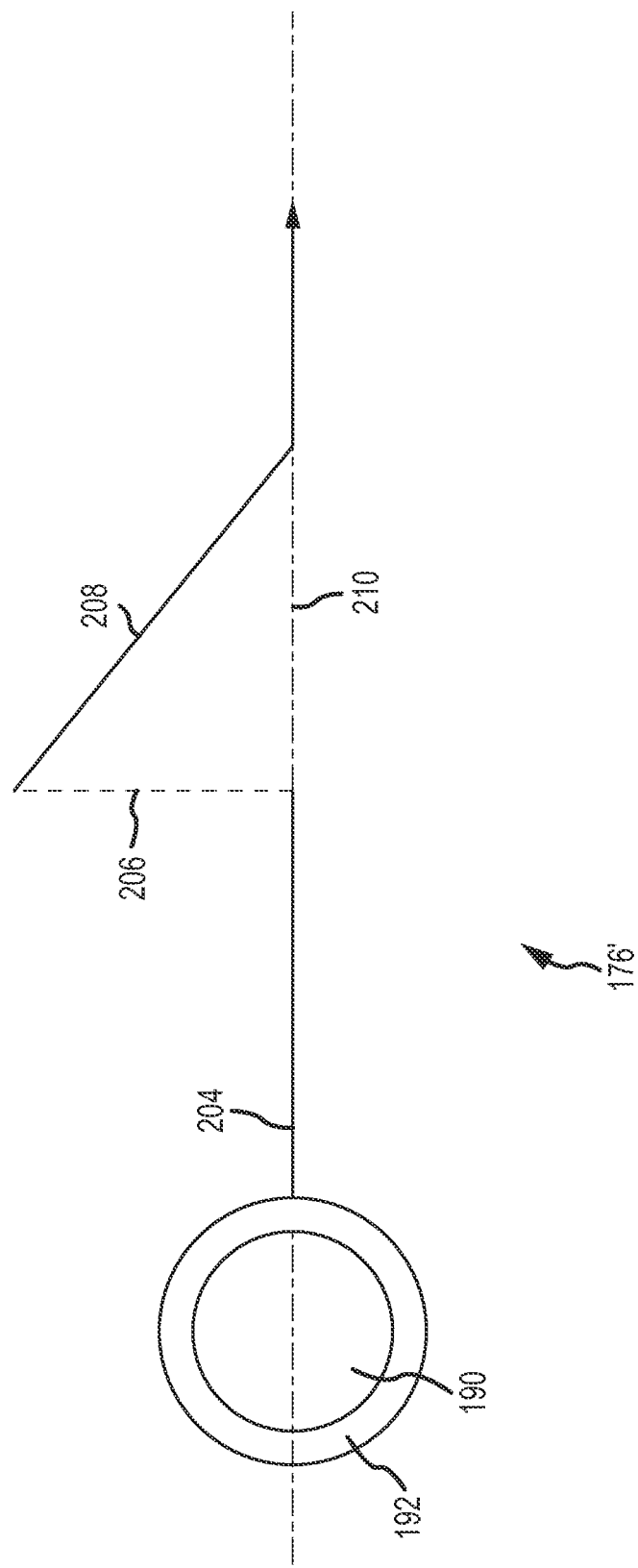
FIG. 12 is a graphical representation of an embodiment of a gesture input.

While the directional gestures (e.g., the drag 176 and flick 178) shown in FIG. 4 include only horizontal motion after the initial touch, this may not be actual movement of the touch during the gesture. For instance, once the drag is initiated in the horizontal direction, movement in a direction other than in the horizontal direction may not result in movement of the screen to be moved in the direction different and the horizontal direction. For instance, with further reference to FIG. 12, the drag 176 from left to right may be initiated with initial movement 204 from left to right along an initiated direction 210. Subsequently, while maintaining contact with the touch sensitive device, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

Figure 5:
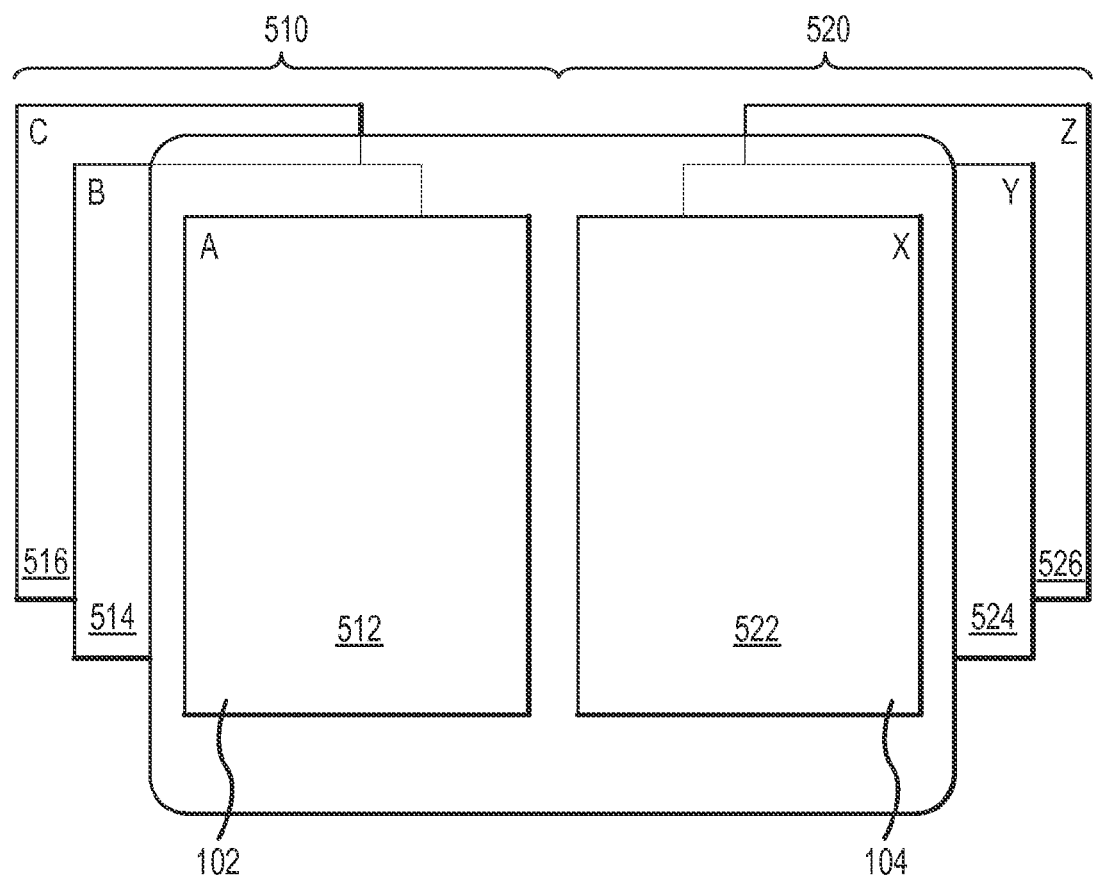
FIG. 5 is a graphical representation of the logical positions of screens executing on displays of an embodiment of a handheld computing device.

As referenced above, screens may be logically associated with a display and be logically arranged with respect to one another even though not all screens are physically rendered on a display. With additional reference to FIG. 5, this concept is further graphically represented. In FIG. 5, a first display 102 actively displays a first application screen (screen A 512). Additionally, a first application stack 510 is depicted. An application stack may be operative to maintain logical associations of a screen with a respective display. In addition, an application stack may logically maintain the relative positions of screens with respect to one another (i.e., the order of the screens in the application stack). In this regard, a screen may be logically disposed in an application stack associated with a display even though the screen may not be physically rendered on the display. A display controller or other control device (e.g., a processor, memory, or an operative combination thereof) may be operative to maintain the logical associations of screens. This may involve storing the logical association of the screen with a display and/or other screens in memory. As such, the logical associations of the screen with a display and with other screens may be logically maintained and/or changed even though the screen is not actively displayed.

For example, the first application stack 510 is comprised of screen A 512, screen B 514, and screen C 516 which are all logically associated with the first display 102. As shown, only screen A 512 from the application stack 510 is physically displayed. Screen B 514 and screen C 516 may belong to the first application stack 510 associated with the first display 102 and be logically positioned behind screen A 510 in the manner shown in FIG. 5. As such, screen B 514 and screen C 516 may be logically positioned behind screen A 512 such that screen B 514 and screen C 516 are not actively rendered on the first display 102. While each application belonging to the first application stack 510 is logically associated with the first display, applications that are not currently rendered in the display may suspend or close when not actively displayed. Alternatively, applications may continue to execute in the background, even though not displayed. Regardless, the non-displayed applications may continue to reside in the application stack 510 until otherwise closed or ended by a user.

A second application stack 520 may also be provided to maintain the logical associations of screens with respect to a second display 104. The second application stack 520 is comprised of screen X 522, screen Y 524, and screen Z 526 and may behave in a manner similar to the first application stack 510 described above. Each of screen A 512, screen B 514, screen C 516, screen X 522, screen Y 524, and screen Z 526 may correspond to individual applications. As shown, screen X 522 is currently displayed. While screen Y 524 and screen Z 526 are logically associated with the second display 104 and are logically positioned behind screen X 522 as shown in FIG. 5. Thus, while each application in the second application stack 520 is disposed in the second display 104, only one application may be actively rendered on the display.

The arrangement (i.e., logical associations) of the screens with respect to the displays and within the application stacks 510, 520 may be arrived at by various methods including manipulation of screens via drag gestures, opening a new application on top of an existing screen rendered on a display, or other means of manipulation whereby screens are moved between the first display 102 and the second display 104.

It may be advantageous to provide a means of organizing, displaying, and manipulating the screens disposed in the first display 102 and the second display 104. In this regard, the logical associations of the screens may be modified. As such, an application manager may be provided. The application manager may be displayed in response to a user input and may provide a user the capability to manipulate and/or observe the logical associations of the multiple screens where not all screens are actively displayed by the device.

Figures 6A, 6B:
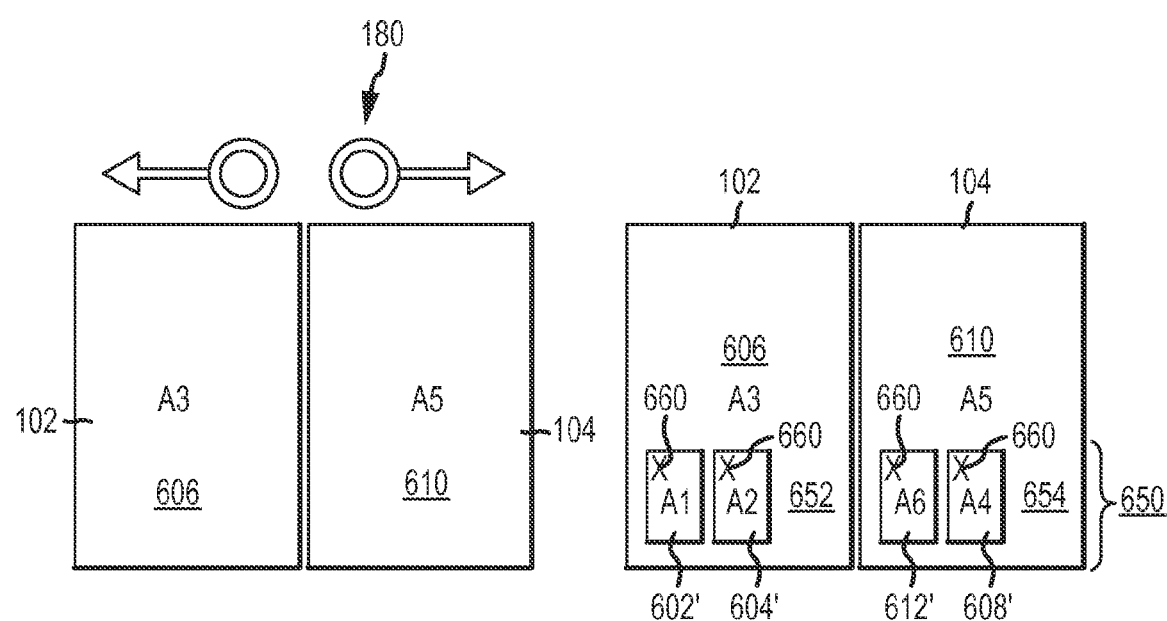
FIGS. 6A and 6B are graphical representations of an embodiment of a handheld computing device displaying an application manager in response to a gesture.

In FIG. 6A, a handheld computing device is shown wherein a first display 102 and a second display 104 are concurrently visible by a user. The first display 102 is depicted in FIG. 6A as displaying screen A3 606. The second display 104 displays screen A5 610. When in the state shown in FIG. 6A, a spread gesture 180 may be received at the handheld computing device by a gesture sensor (e.g., an optical sensor or touch sensor). In response to the spread gesture 180, an application manager 650 may be displayed as shown in FIG. 6B. Other gesture inputs may be used to access the application manager 650. As such, the spread gesture 180 is shown herein for exemplary purposes only.

In FIG. 6B, the application manager 650 occupies corresponding portions of the first display 102 and the second display 104. The application manager 650 may display icons (e.g., icons 602', 604', 608', 612') corresponding to applications logically associated with the first and second display 102 and 104 which are not actively displayed on the first display 102 or the second display 104. In this regard, the icons displayed in the application manager 650 may correspond to applications in a respective application stack which are not currently displayed as was discussed above with regard to FIG. 5. As used herein, a single prime designation indicates an icon representation of a screen, whereas a reference numeral lacking a prime represents the screen itself. The icon representing each application may comprise a screen shot of the application (e.g. a .png or .bmp file) or some other appropriate icon capable of representing the application to a user.

The application manager 650 may include a first portion 652 comprising the portion of the application manager 650 displayed in the first display 102 and a second portion 654 comprising the portion of the application manager 650 displayed in the second display 104. In this regard, an icon representative of an application may be displayed in the portion of the application manager 650 corresponding to the display in which the application represented by the icon is logically associated or logically disposed. That is, an application logically disposed in first display 102 behind the active display screen may be represented by an icon in the first portion 652. Similarly, an application logically disposed in the second display 104 behind the actively displayed screen may be represented by an icon in the second portion 654. The icons shown in the first portion 652 and the second portion 654 may be scrollable such that if more icons are present than can be actively displayed, the icons may be scrolled through via received inputs (e.g., gestures) from a user.

As shown in FIG. 6B, screen A1 602 (represented by icon 602') and screen A2 604 (represented by icon 604') are represented in the first portion 652 of the application manager 650. As such, the user may be able to interpret this in order to determine the applications that are logically disposed in the first display 102 (e.g., the applications residing in the application stack of the first display 102). Similarly, in the second display 104, screen A4 608 (represented by icon 608') and screen A6 612 (represented by icon 612') may be represented in the second portion 654. Thus, the second portion 654 of the application manager 650 may indicate the applications logically disposed in the second display 104 that are not actively displayed (e.g., the applications in the application stack of the second display 104). Note that the actively displayed screen A3 606 and screen A5 610 are not included in the first portion 652 or second portion 654 of the application manager 650. In this regard, the remaining portion of screen A3 606 and screen A5 610 displayed outside the application manager 650 may indicate to a user that they are disposed in a respective display of the device such that no icon representation is needed to be displayed in the first portion 652 or the second portion 654 of the application manager 650 for actively displayed applications.

Additionally, each icon may include a close icon 660 (e.g., an "X" as shown in FIG. 6B) that is operable to close each of the applications represented by the icons. That is, any of the applications logically disposed behind the actively displayed application screen in either of the displays 102 and 104 may be closed or the execution of the application terminated by a user selecting the close icon 660 corresponding to the application. As discussed above, applications may suspend or temporarily end when in the application stack behind the actively displayed screen. Even still, those applications may remain in the stack until the application is closed by selecting a corresponding close icon 660 or by otherwise ending the application. That is, an application, even if suspended or temporarily ended when logically disposed behind the actively displayed screen, is still represented in the application stack until otherwise closed or ended. The application manager 650 may be closed by selecting an icon to change the actively displayed screen, moving an icon between displays, pressing a hardware button (e.g., a "back" button), or by some other appropriate input or gesture.

In addition to the application manager 650 being used to view applications logically disposed in each one of the displays that are not actively displayed by the displays, the application manager 650 may be used to change the actively displayed screens of the handheld computing device. For instance, as shown in FIG. 7A, screen A3 606 is the actively displayed screen in the first display 102 and screen A6 612 is the actively displayed screen in the second display 104. A spread gesture 180 may be received when in the state in FIG. 7A. As such, an application manager 650 may be displayed on the handheld computing device as shown in FIG. 7B. In FIG. 7B, a user may enter a tap gesture 190 to select an icon associated with an application desired to be the actively displayed screen. This may be used to change the actively displayed screen in a respective one of the displays 102 and 104. As shown, a user may enter a tap gesture 190 at icon 602' corresponding to screen A1 602. Thus, as shown in FIG. 7C, the actively displayed screen for the first display 102 is changed to screen A1 602. A subsequent spread gesture 180 received when the device is shown as in FIG. 7C again results in the display of the application manager 650 as shown in FIG. 7D. It can thus be seen that screen A3 606 is now represented by icon 606' as it is no longer the actively displayed screen in the first display 102.

As each application that is not the actively displayed screen may suspend or end temporarily, when a user selects the application to be the actively displayed screen, there may be a lag time before the application corresponding to the screen is loaded. As such, while the application is loaded, a loading overlay may be displayed. The loading overlay may be a screen (e.g., an empty view) that indicates to the user that the application is loading. For instance, the loading overlay may be a revolving circle animation, an hourglass animation, a loading bar animation, or any other appropriate indication that the application to be displayed is loading.

The icons displayed in the application manager 650 may be displayed in a manner that represents the relative logical location of the screens in the application stack to which the screen belongs. Thus, an icon to the right of the first portion 652 or second portion 654 of the application manager 650 may represent the next screen directly behind the actively displayed screen in the respective display. In this regard, the application stack of each display 102 and 104 may be represented in a descending order such that the bottom most screen of the application stack is displayed as the furthest left in either the first portion 652 or the second portion 654. The order of the icons may thus represent the logical order of the screens within an application stack. Alternatively, the icons may be arranged such that the left most icon is representative of the next screen in the application stack and the right most screen being the last or bottom application in the application stack. Additionally, as the user may envision the various applications as being stacked behind the actively displayed application, upon movement of an application from one display to another, a user may interpret the application being moved from one application stack into another applications stack. Accordingly, when applications are moved from a first application stack to a second application stack, the application may go to the bottom or back of the stack by default, go to the top or front of the application stack by default, or be placed in the new application stack based on where among the other icons the user places the application.

Figure 8A:
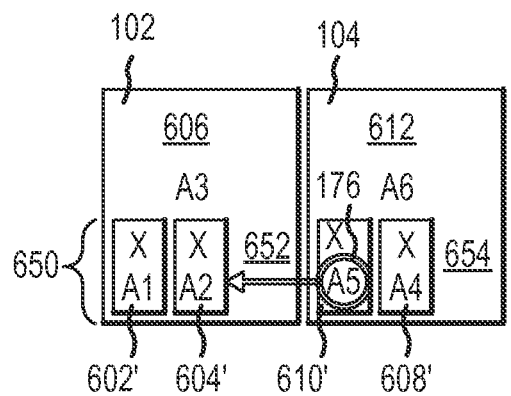
FIGS. 8A-8D are graphical representations of another embodiment of a handheld computing device displaying an application manager in response to a gesture and reacting in response to commands received via the application manager.
Figure 8B:
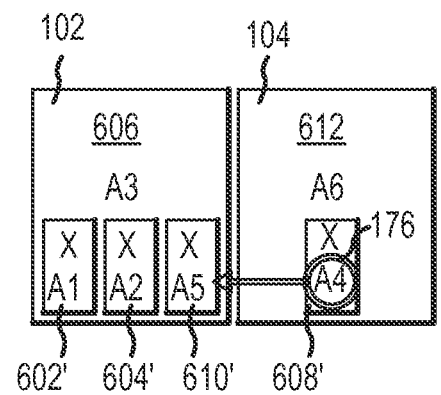

In this regard, the application manager 650 may be used to change a screen from belonging to one application stack associated with one display to a second application stack associated with another display. Such an operation is depicted in FIGS. 8A through 8D. In FIG. 8A, screen A3 606 is the actively displayed screen in the first display 102 and screen A6 612 is the actively displayed screen in the second display 104. The application manager 650 has been opened to reveal the other applications logically disposed in the respective application stacks of the first display 102 and the second display 104. A drag gesture 176 may be received that originates adjacent to the icon 610' corresponding to screen A5 610. The drag gesture 176 may be a right-to-left drag gesture in a direction from the second display 104 to the first display 102. Note the drag gesture 176 is in a direction such that the termination of the drag gesture 176 is in the first portion 652 of the application manager 650 corresponding to the first display 102. The result is shown in FIG. 8B. As can be seen, the icon 610' corresponding to screen A5 610 has been moved from the second portion 654 of the application manager 650 to the first portion 652 of the application manager 650. Thus, screen A5 610 is now logically disposed in the first display 102 behind the actively displayed screen and is displayed along with the other icons of the applications logically disposed in the first display 102. In this regard, the logical association of screen A5 610 is modified from the second display 104 to the first display 102.

Figure 8C:
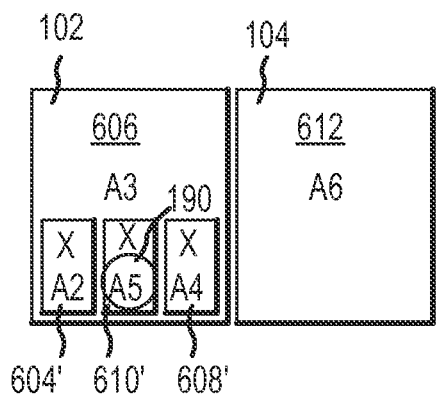
Figure 8D:
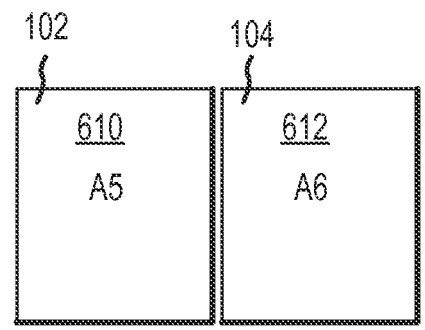

Additionally, as shown in FIG. 8B, a drag gesture 176 may also be received that originates at the icon 608' corresponding to screen A4 608. Drag gesture 176 also terminates in the first portion 652. The result is shown in FIG. 8C. In FIG. 8C, icon 608' corresponding to screen A4 608 has been moved to the first portion 652 of the application manager 650. Thus, screen A4 608 is now logically disposed in the first display 102. The icon 602' corresponding to screen A1 602 has been displaced such that it is off the display 102. The icon 602' corresponding to screen A1 602 may be viewed by scrolling to the left in the first portion 652 of the application manager 650. In this regard, as each icon is moved to the first portion 652 of the application manager 650, the application may be added to the back or bottom of the application stack. As shown in FIG. 8C, a tap 190 is received at icon 610' corresponding to screen A5 610. The result is shown in FIG. 8D, wherein screen A5 610 is displayed in the first display 102 and the application manager 650 is closed. Thus, once an application screen has been selected to be the actively displayed screen in a display, the application manager 650 may be hidden in response to the selection of the actively displayed screen.

Figure 9A:
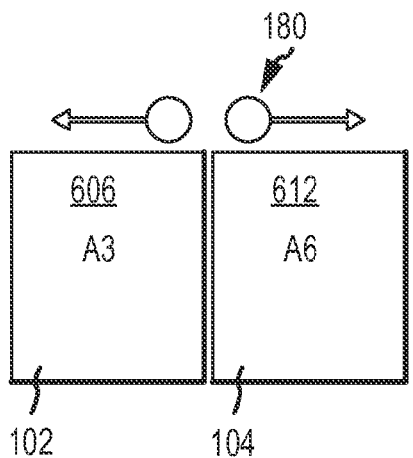
FIGS. 9A-9D are graphical representations of yet another embodiment of a handheld computing device displaying an application manager in response to a gesture and reacting in response to commands received via the application manager.
Figure 9B:
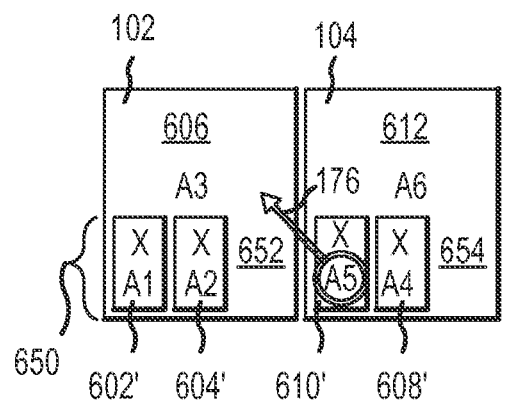
Figure 9C:
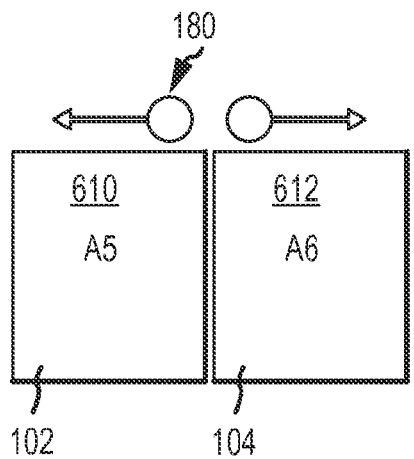
Figure 9D:
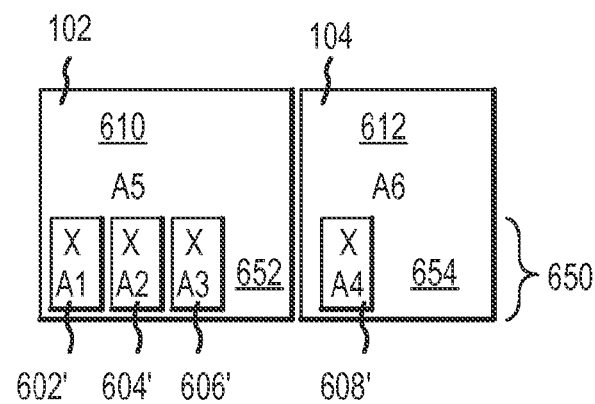

In an alternative embodiment, a drag gesture 176 may be used by the user such that an icon is not dragged into another portion of the application manager 650 but rather is dragged to an active portion of a display. Such a gesture may result in the modification of the display into which the icon is dragged such that the application corresponding to the icon becomes the actively displayed screen in that display. This operation is shown in FIGS. 9A through 9D. In FIG. 9A, screen A3 606 is the actively displayed screen in the first display 102. Screen A6 612 is the actively displayed screen in the second display 104. A spread gesture 180 is displayed in FIG. 9A resulting in the display of the application manager 650 as shown in FIG. 9B. In FIG. 9B a drag gesture 176 originating on icon 610' corresponding to screen A5 610 is received. The drag gesture 176 terminates in the active portion of the first display 102 outside the display area dedicated to the application manager 650. Thus, screen A5 610 may be changed to be the actively displayed screen in the first display 102 as shown in FIG. 9C. The application manager 650 may be hidden in FIG. 9C after receipt of the drag gesture 176 that results in the change of the actively displayed screen first display 102 to be screen A5 610. A subsequent spread gesture 180 received when the handheld computing device is in a state shown in FIG. 9C results in the display of the application manager 650. As can be seen, an icon 606' corresponding to screen A3 606 is now displayed in the application manager 650, indicating that screen A3 606 is in the application stack corresponding to the first display 102, yet is no longer the actively displayed screen. Furthermore, the icon 610' has been removed from the second portion 654 of the application manager 650 as screen A5 610 is no longer in the application stack associated with the second display 104. Thus, the drag gesture 176 received at the second portion 654 of the application manager 650 that terminated in the active portion of a different display resulted in the application screen corresponding to the icon becoming the actively displayed screen in the display where the drag gesture 176 terminated.

Additionally, functionality may be provided wherein an actively displayed screen may be moved from one display to the other display. Such an operation is shown in FIGS. 10A through 10D. In FIG. 10A, screen A5 610 is the actively displayed screen in the first display 102. Screen A6 612 is the actively displayed screen in the second display 104. A spread gesture 180 is received on the handheld computing device is shown in FIG. 10A. As a result, an application manager 650 is displayed as shown in FIG. 10B. The application stack corresponding to the first display 102 includes screen A1 602 (represented by icon 602'), screen A2 604 (represented by icon 604'), screen A3 606 (represented by icon 606'), and screen A5 610 which is the actively displayed screen in the first display 102. The second display 104 includes in its application stack screen A4 608 (represented by icon 608') and screen A6 612 which is the actively displayed screen in the second display 104. As shown in FIG. 10B, a drag gesture 176 is received in the active portion of the first display 102 that terminates in the active potion of the second display 104. In turn, as shown in FIG. 10C, screen A5 610 becomes the actively displayed screen in the second display 104. As screen A3 606 was the next screen in the application stack (as indicated in FIG. 10B by virtue of the fact the icon 606' corresponding to screen A3 606 was the right most icon in the first portion 652 of the application manager 650), screen A3 606 becomes the actively displayed screen for the first display 102. A subsequent spread gesture 180 received when the handheld computing device is in the state shown in FIG. 10C results in the opening of the application manager 650. As can be seen, the icon 606' corresponding to screen A3 606 has been removed from the first portion 652 of the application manager 650 in that screen A3 606 is now the actively displayed screen in the first display 102. The icon 612' corresponding to screen A6 612 is now displayed in the second portion 654 of the application manager 650. This is because when screen A5 610 became an actively displayed screen in the second display 104, it was placed over or in front of screen A6 612. Thus, screen A6 612 is no longer the actively displayed screen and thus is represented with icon 612' in the second portion 654 of the application manager 650 indicating that screen A6 612 is now behind screen A5 610 in the application stack corresponding to the second display 104.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for controlling a handheld computing device, comprising:
    providing a first display and a second display associated with the handheld computing device, the first display shown on a first touch screen and the second display shown on a second touch screen;
    logically associating, by a processor, two or more applications with the first display, wherein at least one application is actively displayed and at least one application is not actively displayed on the first display;
    logically associating, by the processor, two or more applications with the second display, wherein at least one application is actively displayed and at least one application is not actively displayed on the second display;
    establishing, by the processor, a first application stack corresponding to the one or more applications logically associated with the first display, wherein the first application stack is a first logical representation of the two or more applications associated with the first display;
    establishing, by the processor, a second application stack corresponding to any applications logically associated with the second display, wherein the second application stack is a second logical representation of the two or more applications associated with the second display, the first and the second application stacks respectively maintaining relative positions of the two or more applications with each display,
        wherein, the first and second application stacks being respective logical arrangements within an operating system of the device of the one or more actively and inactively displayed applications for the device, wherein an application model manager converts the logical window stack maintained in a task manager module to a linear organization that a user perceives;
    receiving, by the processor, a gesture input at a gesture sensor of the handheld computing device; and
    displaying, by the processor, an application manager in response to the receiving, wherein the application manager provides a graphical representation of the first application stack and the second application stack in a portion of, but not the entirety of, the first display and in a portion of, but not the entirety of, the second display.

2. The method according to claim 1, wherein the first display is operable to display only one application at a time, and wherein the second display is operable to display only one application at a time.

3. The method according to claim 2, wherein the application manager includes two or more icons representing the two or more applications associated with the first display in a first portion of the application manager and two or more icons representing the two or more applications associated with the second display in a second portion of the application manager.

4. The method according to claim 2, wherein the first portion of the application manager is displayed in said first display and said second portion of the application manager is displayed in said second display.

5. The method according to claim 4, wherein the icons are arranged according to the relative position of the two or more applications in the first application stack and the relative position of applications in the second application stack.

6. The method according to claim 5, wherein said icons comprise screen shot representations of a corresponding application.

7. The method according to claim 6, further comprising:
    selecting an application from one of the first application stack and the second application stack in the application manager; and
    modifying a corresponding one of the first display and the second display to render the selected application on the corresponding one of the first and the second display.

8. The method according to claim 7, wherein the logical association of the two or more applications is controllable by user interaction with the application manager.

9. The method according to claim 8, further comprising:
    selecting an application comprising an actively displayed application of one of the first and second display;
    dragging the application to the other of the first and second display; and
    changing the other of the first and second display such that the application is the actively displayed application on the other of the first and second display.

10. The method according to claim 9, further comprising: moving an application from one of the first and second application stacks to another of the first and second application stacks by dragging an icon representative of the application from the first portion of the application manager displayed on the first display to the second portion of the application manager displayed on the second display.

11. The method according to claim 9, further comprising:
    dragging an application from the first portion of the application manager to the second display; and
    modifying the second display to render the application.

12. The method according to claim 9, further comprising: closing any one of the two or more applications by selecting a corresponding close icon from the application manager.

13. The method according to claim 8, wherein the interaction with the application manager includes manipulation of the icons representing the two or more applications.

14. The method according to claim 1, wherein the gesture input is a spread gesture.

15. The method according to claim 1, wherein the first display comprises a first portion of a unitary display and the second display comprises a second portion of a unitary display.

16. A handheld computing device, comprising:
- a processor;
- a first display operable to display a first screen, the first display being in operative communication with the processor, wherein one or more applications are logically associated with the first screen in a first application stack, and wherein the first application stack is a first logical representation of the one or more applications associated with the first screen;
- a second display operable to display a second screen, the second display being in operative communication with the processor, wherein one or more applications are logically associated with the second screen in a second application stack, and wherein the second application stack is a second logical representation of the one or more applications associated with the second screen, the first and the second application stacks respectively maintaining relative positions of the one or more applications with each screen, wherein the first screen and the second screen are separate touch screens and wherein the first and second application stacks being respective logical arrangements within an operating system of the device of the one or more actively and inactively displayed applications for the device, wherein an application model manager converts the logical window stack maintained in a task manager module to a linear organization that a user perceives; and
- at least one gesture sensor operable to receive a gesture input; and
- wherein the processor is operative to control at least one of the first display and the second display such that an application manager is displayed on a portion of both the first display and the second display in response to receipt of the gesture input, wherein the application manager displays a graphical representation of the first and second application stacks, and wherein the processor renders the application manager in a portion of, but not the entirety of, the first display and in a portion of, but not the entirety of, the second display.

17. The device as recited in claim 16, wherein the handheld computing device comprises a smart phone.

18. The device as recited in claim 17, wherein the first display and second display are positionable with respect to each other between an open and closed position.

19. The device as recited in claim 18, wherein, when in the open position, the first display and the second display are visible from the vantage point of a user.

20. The device as recited in claim 19, wherein, when in the closed position, only one of the first display and the second display are visible from the vantage point of a user.

* * * * *